United States Patent
Louis et al.

(10) Patent No.: US 11,359,120 B2
(45) Date of Patent: Jun. 14, 2022

(54) POLYMER-METAL JUNCTION

(71) Applicant: Solvay Specialty Polymers USA, LLC, Alpharetta, GA (US)

(72) Inventors: Chantal Louis, Alpharetta, GA (US); Mohammad Jamal El-Hibri, Atlanta, GA (US); Ryan Hammonds, Atlanta, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 0 days.

(21) Appl. No.: 16/644,960

(22) PCT Filed: Sep. 13, 2018

(86) PCT No.: PCT/EP2018/074811
§ 371 (c)(1),
(2) Date: Mar. 6, 2020

(87) PCT Pub. No.: WO2019/053164
PCT Pub. Date: Mar. 21, 2019

(65) Prior Publication Data
US 2021/0122953 A1    Apr. 29, 2021

Related U.S. Application Data

(60) Provisional application No. 62/558,615, filed on Sep. 14, 2017.

(30) Foreign Application Priority Data

Feb. 21, 2018  (EP) .................................... 18157838

(51) Int. Cl.
| C09J 171/00 | (2006.01) |
| C08G 65/40 | (2006.01) |
| C08J 5/12 | (2006.01) |
| C08L 71/00 | (2006.01) |

(52) U.S. Cl.
CPC ........ *C09J 171/00* (2013.01); *C08G 65/4012* (2013.01); *C08J 5/125* (2013.01); *C08L 71/00* (2013.01); *C08G 2650/40* (2013.01); *C08J 2371/00* (2013.01)

(58) Field of Classification Search
CPC ................................................ C08G 65/4012
See application file for complete search history.

(56) References Cited

U.S. PATENT DOCUMENTS

| 2016/0152769 A1* | 6/2016 | Wilson ..................... C08K 7/06 |
| | | 524/592 |
| 2017/0190835 A1* | 7/2017 | Trivedi .............. C08G 65/4012 |
| 2017/0197393 A1* | 7/2017 | Crawley ............... B32B 27/285 |
| 2017/0362379 A1* | 12/2017 | El-Hibri .................. C08G 75/23 |
| 2018/0208740 A1* | 7/2018 | Matthews .......... C08G 65/4012 |
| 2018/0244846 A1* | 8/2018 | Flanagan ............... C08G 65/48 |
| 2019/0031908 A1* | 1/2019 | Louis .................. C08G 65/4025 |
| 2019/0322804 A1* | 10/2019 | Louis ..................... C08K 3/013 |
| 2020/0181360 A1* | 6/2020 | El-Hibri .................. B32B 15/08 |

FOREIGN PATENT DOCUMENTS

| EP | 184458 A2 | 6/1986 |
| EP | 1559542 A1 | 8/2005 |
| EP | 1459882 B1 | 2/2010 |
| WO | 2011123790 A1 | 10/2011 |
| WO | 2015189567 A1 | 12/2015 |
| WO | 2016092087 A1 | 6/2016 |
| WO | 2017153290 A1 | 9/2017 |
| WO | 2018024744 A1 | 2/2018 |

OTHER PUBLICATIONS

ASTM D3418-03—Standard Test Method for Transition Temperatures of Polymers by Differential Scanning Calorimetry, 2003, 7 pages.
ASTM E794-06—Standard Test Method for Melting And Crystallization Temperatures by Thermal Analysis, 2006, 4 pages.

* cited by examiner

*Primary Examiner* — Liam J Heincer
(74) *Attorney, Agent, or Firm* — Osha Bergman Watanabe & Burton LLP

(57) ABSTRACT

Disclosed is a polymer-metal junction including a polymer composition in contact with a metal substrate, where the polymer composition comprises a polymer component including a PEEK-PEDEK copolymer having a PEEK/PEDEK mole ratio ranging from about 60/40 to about 30/70 and a melting point (Tm) greater than 320° C., and where the polymer composition includes less than 10 wt. % of a sulfur-or-carbonyl-containing solvent, based on the total weight of the polymer composition. Also disclosed are methods of making the polymer-metal junction and articles including the polymer-metal junction.

18 Claims, No Drawings

POLYMER-METAL JUNCTION

RELATED APPLICATIONS

This application is a U.S. national stage entry under 35 U.S.C. § 371 of International Application No. PCT/EP2018/074811 filed Sep. 13, 2018, which claims priority to U.S. provisional application No. U.S. 62/558,615 filed on Sep. 14, 2017, and to European patent application No. 18157838.6, filed on Feb. 21, 2018, the whole content of each of these applications being incorporated herein by reference for all purposes.

FIELD OF THE INVENTION

The present invention relates to a polymer-metal junction including a polymer composition in contact with a metal substrate, where the polymer composition comprises polymer component including a PEEK-PEDEK copolymer having a PEEK/PEDEK mole ratio ranging from about 60/40 to about 30/70, and a melting point (Tm) greater than 320° C., the polymer composition including less than 10 wt. % of a sulfur-or-carbonyl-containing solvent, based on the total weight of the polymer composition. Also described are methods of making the polymer-metal junction and articles including the polymer-metal junction.

BACKGROUND

Poly(ether ether ketone) (PEEK), a type of poly(aryl ether ketone) (PAEK), is known for its high temperature performance and excellent chemical resistance; however, PEEK is not known to adhere well to metal, which limits its use in areas where adhesion to metal is particularly important, such as wire coatings, mobile electronics, and automotive applications.

The primary approach to improving adhesion of PAEKs to metal has been to use PAEKs having a lower crystallinity than PEEK, such as amorphous PAEKs; however, these lower crystallinity materials have reduced chemical resistance as compared to PEEK, limiting their application in demanding applications where good chemical resistance is essential, such as oil and gas, automotive, mobile electronics applications.

Accordingly, a need exists for PAEK compositions that adhere well to metal without significant loss in chemical resistance.

DETAILED DESCRIPTION OF PREFERRED EMBODIMENTS

Described herein is a polymer-metal junction including a polymer composition in contact with a metal substrate, where the polymer composition comprises a polymer component including a PEEK-PEDEK copolymer having a PEEK/PEDEK mole ratio ranging from about 60/40 to about 30/70 and a melting point (Tm) greater than 320° C., the polymer composition including less than 10 wt. % of a sulfur-or-carbonyl-containing solvent, based on the total weight of the polymer composition.

Applicants surprisingly discovered that polymer compositions including a PEEK-PEDEK copolymer having a PEEK/PEDEK mole ratio ranging from about 60/40 to about 30/70 exhibit increased adhesion to metal while maintaining a crystallinity (and therefore chemical resistance) on par with that of PEEK.

In addition, Applicants also surprisingly discovered that formulations of PEEK, optionally poly(ether ketone ketone) PEKK, and the PEEK-PEDEK copolymer of the invention exhibit (i) improved adhesion to metal as compared with similar PEEK formulations not including the PEEK-PEDEK copolymers of the invention, and (i) a crystallinity (and chemical resistance) on par with that of PEEK.

In some embodiments, the polymer component preferably has a heat of fusion determined according to ASTM D3418-03 and E793-06 of greater than 45 J/g, preferably greater than 50 J/g.

As used herein, "sulfur-or-carbonyl-containing solvent" means a solvent comprising a sulfur group, a carbonyl group, or a combination thereof.

Sulfur-containing solvents include, for example, diphenyl sulfone, phenyl tolyl sulfone, ditolyl sulfone, xylyl tolyl sulfone, dixylyl sulfone, tolyl paracymyl sulfone, phenyl biphenyl sulfone, tolyl biphenyl sulfone, xylyl biphenyl sulfone, phenyl naphthyl sulfone, tolyl naphthyl sulfone, xylyl naphthyl sulfone, diphenyl sulfoxide, phenyl tolyl sulfoxide, ditolyl sulfoxide, xylyl tolyl sulfoxide, dixylyl sulfoxide, dibenzothiophene dioxide, and mixtures thereof.

Carbonyl-containing solvents, include, for example, benzophenone.

The polymer composition includes less than 10 wt. %, preferably less than 5 wt. %, preferably less than 3 wt. % of a sulfur-or-carbonyl-containing solvent, preferably diphenyl sulfone, based on the total weight of the polymer composition.

In some embodiments, the polymer composition includes less than 5 wt. %, preferably less than 3 wt. %, preferably less than 1 wt. % of fluoride salts such as sodium fluoride and potassium fluoride.

PEEK-PEDEK Copolymer

As used herein, a "PEEK-PEDEK copolymer" denotes a polymer comprising recurring units ($R_{PEEK1}$) of formula:

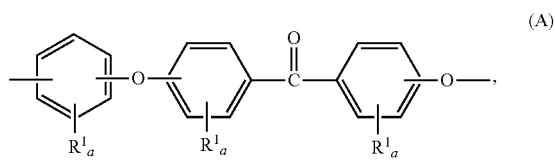

(A)

and
recurring units ($R_{PEDEK}$) of formula (B):

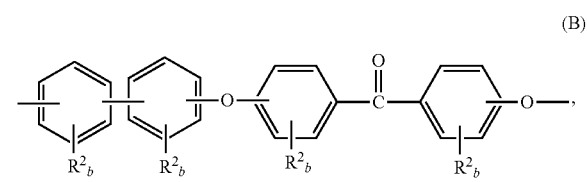

(B)

where each $R^1$ and $R^2$ is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
each a and b is independently selected from an integer ranging from 0 to 4. Preferably each a and b is zero.

Preferably, recurring units ($R_{PEEK1}$) are selected from units of formula:

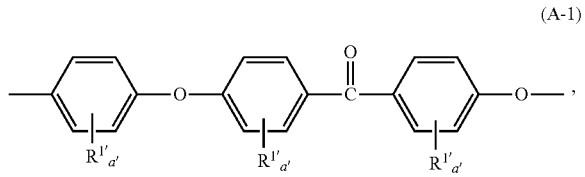

(A-1)

and recurring units ($R_{PEDEK}$) are selected from units of formula:

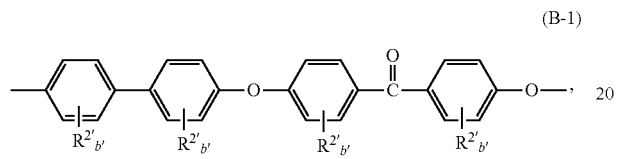

(B-1)

where each of $R^{1'}$, $R^{2'}$, a', and b' is independently selected from the groups described above for $R^1$, $R^2$, a, and b, respectively. Preferably each a' and b' is zero.

Recurring units ($R_{PEEK1}$) and ($R_{PEDEK}$) collectively represent at least 50 mol %, preferably at least 60 mol %, 70 mol %, 80 mol %, 90 mol %, 95 mol %, and most preferably at least 99 mol % of recurring units in the PEEK-PEDEK copolymer.

Recurring units ($R_{PEEK1}$) and ($R_{PEDEK}$) are present in the PEEK-PEDEK copolymer in a ($R_{PEEK1}$)/($R_{PEDEK}$) molar ratio ranging from about 60/40 to about 30/70, preferably from about 50/50 to about 30/70, from about 45/55 to about 30/70, from about 45/55 to about 35/65, from about 45/55 to about 28/72. Most preferably, the ($R_{PEEK1}$)/($R_{PEDEK}$) molar ratio is from about 40/60 to about 30/70. Thus, in some embodiments, the ($R_{PEEK1}$)/($R_{PEDEK}$) molar ratio is less than 1. The "PEEK/PEDEK mole ratio" is used interchangeably herein with the "($R_{PEEK1}$)/($R_{PEDEK}$) molar ratio."

The PEEK-PEDEK copolymer preferably exhibits a reduced viscosity (RV) (measured pursuant to ASTM D2857 at 25° C. with a 1.0 wt/vol % solution in concentrated $H_2SO_4$ (96 wt %) and expressed in dl/g) ranging from 0.2 to 6.0, more preferably from 0.7 to 5.5 and most preferably from 0.9 to 5.0 dL/g.

The PEEK-PEDEK copolymer preferably exhibits a melt viscosity (MV) (measured pursuant to ASTM D3835 at 410° C. and at a shear rate of 46.3 sec$^{-1}$, using a conical die having a diameter of 1.016 mm, a length of 20.32 mm, and a cone angle of 120° C. and expressed in kN/m$^2$) ranging from 0.05 to 1.5, more preferably from 0.08 to 1.0, and most preferably from 0.1 to 0.8 dL/g.

The PEEK-PEDEK copolymer has as melting point (Tm) greater than 320° C., where the melting point (Tm) is determined by differential scanning calorimetry (DSC) as described in the Examples.

Particularly suitable, are PEEK-PEDEK copolymers having a melting temperature (Tm), a crystallization temperature (Tc), and a glass transition temperature (Tg) satisfying the relationship, (Tm−Tc)/(Tm−Tg)<0.31, where the melting point (Tm), crystallization temperature (Tc), and glass transition temperature (Tg) are determined as described in the Examples.

The PEEK-PEDEK copolymer is present in an amount ranging from about 1 to about 100 wt. %, preferably from about 10 to about 60 wt. %, preferably from about 10 to about 45 wt. %, more preferably from about 15 to about 40 wt. %, and even more preferably from 20 to about 35 wt. %, based on the weight of the polymer composition.

Optional Poly(Ether Ether Ketone) (PEEK)

In some embodiments, the polymer component further comprises PEEK in addition to the PEEK-PEDEK copolymer.

As used herein, a "poly(ether ether ketone) (PEEK)" denotes any polymer comprising more than 65 mol % of recurring units ($R_{PEEK2}$) selected from the group consisting of units of formula:

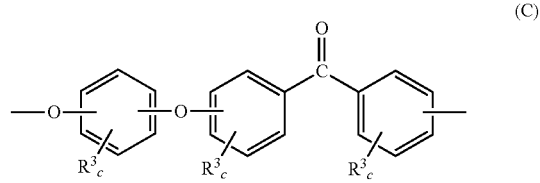

(C)

where each $R^3$ is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and each c is independently selected from 0, 1, 2, 3, and 4. Preferably, each c is 0.

Preferably at least 70 mol %, 80 mol %, 90 mol %, 95 mol %, 99 mol % of recurring units ($R_{PEEK2}$) are selected from the group consisting of recurring units of formula (C).

In some embodiments, the PEEK is a polymer of which more than 65 mol % of the recurring units ($R_{PEEK2}$) are recurring units of formula:

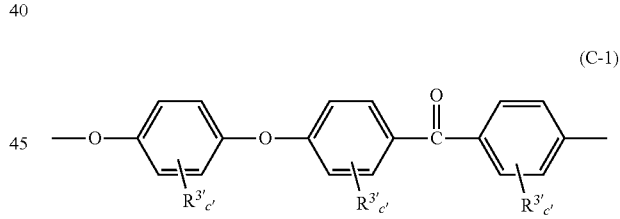

(C-1)

where each $R^{3'}$ and c' is independently selected from the groups described above for $R^3$ and c, respectively. Preferably each c' is zero.

Preferably at least 70 mol %, 80 mol %, 90 mol %, 95 mol %, 99 mol % of recurring units ($R_{PEEK2}$) are recurring units of formula (C-1).

The polymer composition preferably includes from about 90 to about 20 wt. %, preferably from about 70 to about 30 wt. %, and even more preferably from about 60 to about 40 wt. % PEEK.

Optional Poly(ether ketone ketone) (PEKK)

The polymer component may optionally further include a poly(ether ketone ketone) (PEKK) in addition to the PEEK-PEDEK copolymer and the PEEK described above.

As used herein, a "poly(ether ketone ketone) (PEKK)" denotes any polymer comprising more than 50 mol % of recurring units ($R_{PEKK}$) selected from the group consisting of units of formula:

(D)

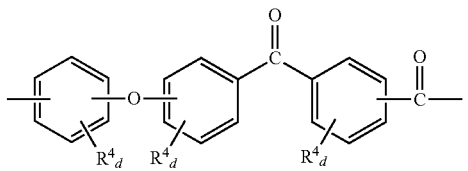

where each $R^4$ is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and each d is independently selected from 0, 1, 2, 3, and 4. Preferably, each d is 0.

Preferably, at least 60 mol %, 70 mol %, 80 mol %, 90 mol %, 95 mol %, 99 mol % of recurring units ($R_{PEKK}$) are selected from the group consisting of recurring units of formula (D).

In some embodiments, the PEKK is a polymer of which more than 50 mol % of the recurring units ($R_{PEKK}$) are a combination of recurring units of formulas (D-1) and (D-2):

(D-1)

(D-2)

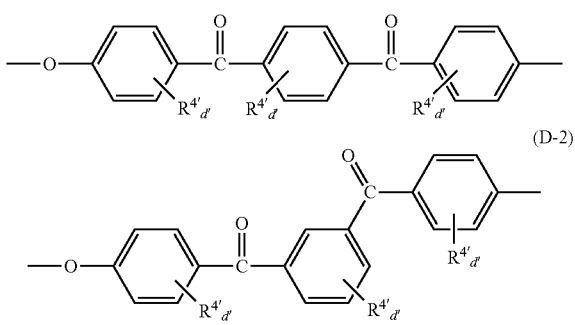

where each $R^{4'}$ and d' is independently selected from the groups described above for $R^4$ and d, respectively. Preferably each d' in formulas (D-1) and (D-2) is zero.

Preferably at least 60 mol %, 70 mol %, 80 mol %, 90 mol %, 95 mol %, 99 mol % of recurring units ($R_{PEKK}$) are a combination of recurring units (D-1) and (D-2).

In some embodiments, the mol ratio of units (D-1)/(D-2) ranges from 50/50 to 85/15, preferably from 55/45 to 80/20, more preferably from 55/45 to 70/30.

The polymer composition preferably includes from 1 to 35 wt. %, more preferably from 7 to 30 wt. %, still more preferably from 13 to 25 wt. % PEKK.

Optional Low Molecular Weight Aromatic Compound

As used herein a "low molecular weight compound" means at least one compound selected from the group consisting of compounds of formula:

(E)

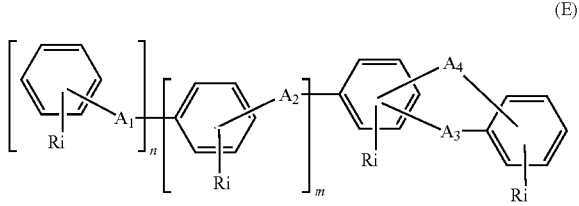

where each of $A_1$, $A_3$, and $A_4$ is independently selected from the group consisting of a bond, a sulfone group [–S(=O)$_2$–], a ketone group [—C(=O)—], an ether [—O—], and a group —C($R^5$)($R^6$)—, provided that $A_4$ is optional.

Each $A_2$ is independently selected from the group consisting of a bond, a sulfone group [—S(=O)$_2$—], a ketone group [—C(=O)—], an ether [—O—], a group —C($R^5$)($R^6$)—, and a group:

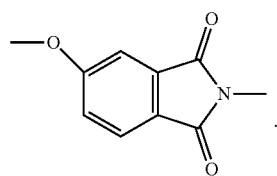

Each $R^5$ and $R^6$ is independently selected from the group consisting of a hydrogen, a halogen, an optionally-halogenated alkyl, an alkenyl, an alkynyl, a phenyl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, a —CF$_3$ group, an amine, and a quaternary ammonium. Each $R^5$ and $R^6$ is preferably a methyl or phenyl group.

Each R is independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium.

Each i is independently selected from 0, 1, 2, 3, 4, and 5; provided, however, that the maximum value for i is equal to the number of positions free for substitution on the respective aromatic ring. For example, i may range from 0 to 5 for terminal phenyl groups but only range from 0 to 4 for non-terminal phenyl groups. Preferably, i is 0.

n is an integer selected from 0 and 1, and m is an integer ranging from 0 to 32.

The linkages between the phenylene units and $A_1$-$A_4$ may independently have 1,2-, 1,3- or 1,4-linkages. Preferably, the linkages are 1,3- or 1,4-.

The low molecular weight aromatic compound has a molecular weight as measured by gel permeation chromatography (GPC) using polystyrene calibration standards ranging from 154 g/mol to 3000 g/mol, preferably from 154 g/mol to 2000 g/mol, more preferably from 154 g/mol to 1000 g/mol, most preferably from 154 g/mol to 500 g/mol.

In some aspects, the low molecular weight aromatic compound is selected from compounds of formula (E-1)

(E-1)

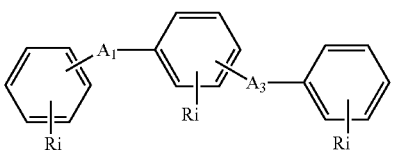

where $A_1$, $A_3$, R, and i are as described above.

Suitable examples of low molecular weight aromatic compounds of formula (E-1) are 1,3-diphenoxybenzene, 1,4-diphenoxybenzene, m-terphenyl, and p-terphenyl.

In some aspects, the low molecular weight aromatic compound is selected from compounds of formula (E-2):

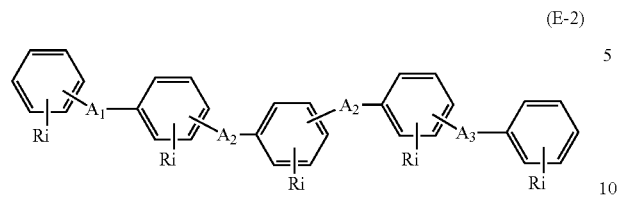
(E-2)

where $A_1$, $A_2$, $A_3$, R and i are as described above.

Suitable examples of low molecular weight aromatic compounds of formula (E-2) are polyphenylether compounds sold under the trade name Santovac® from SantoLubes LLC, South Carolina, USA.

In some embodiments, the low molecular weight aromatic compound of formula (E-2) is 1,4-Bis(4-phenoxybenzoyl)benzene of formula (E-2-1) below:

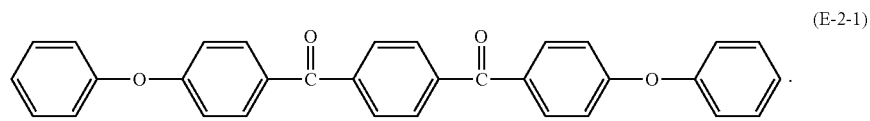
(E-2-1)

In some aspects the low molecular weight aromatic compound is selected from compounds of formula (E-3):

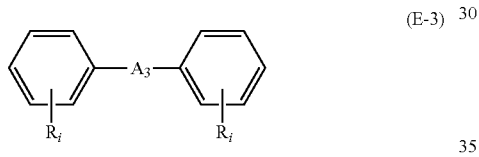
(E-3)

where $A_3$, R, and i are as described above.

The low molecular weight aromatic compound is preferably diphenyl sulfone, 1,4-Bis(4-phenoxybenzoyl)benzene, alkali metal diphenyl sulfone sulfonate, benzophenone, or a combination thereof.

According to alternative embodiments the low molecular weight aromatic compound is an imide preferably selected from compounds of formulae (E-4) and (E-5):

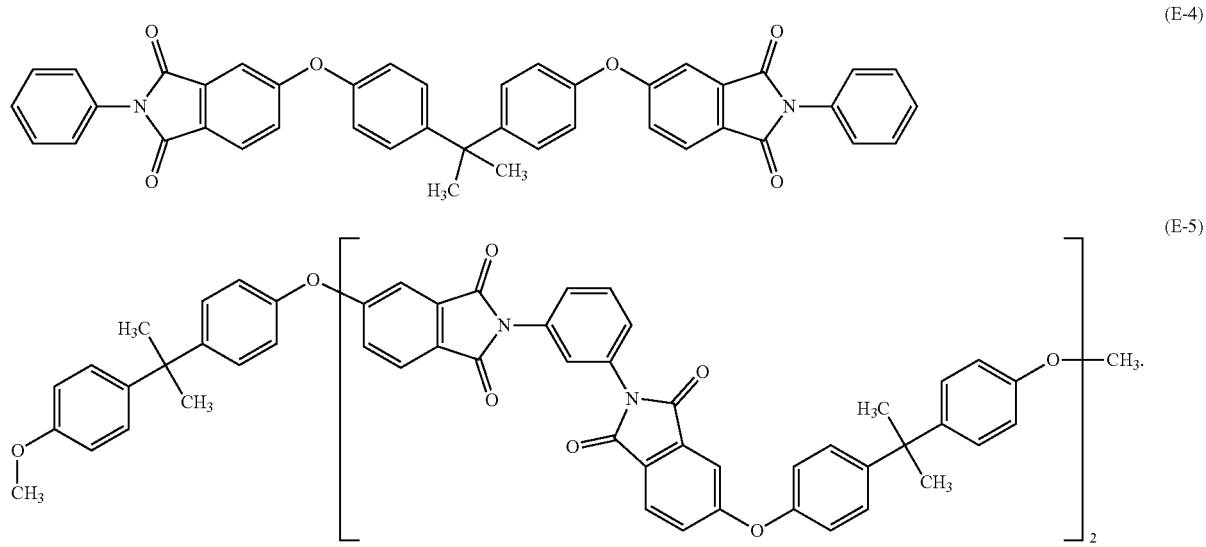
(E-4)

(E-5)

The low molecular weight aromatic compound preferably ranges from 0.5 wt. % to 5 wt. %, preferably from 1 wt. % to 3 wt. %, by weight of the polymer composition.

Preferably, the polymer composition includes less than 3 wt. %, by weight of the low molecular weight aromatic compound. Most preferably, the low molecular weight aromatic compound ranges from 1.5 wt. % to 2.5 wt. % by weight of the polymer composition.

Optional Reinforcing Fillers

The polymer composition may optionally include reinforcing fillers such as fibrous or particulate fillers. A fibrous reinforcing filler is a material having length, width and thickness, wherein the average length is significantly larger than both the width and thickness. Preferably, such a material has an aspect ratio, defined as the average ratio between the length and the smallest of the width and thickness of at least 5. Preferably, the aspect ratio of the reinforcing fibers is at least 10, more preferably at least 20, still more preferably at least 50. The particulate fillers have an aspect ratio of at most 5, preferably at most 2.

Preferably, the reinforcing filler is selected from mineral fillers, such as talc, mica, kaolin, calcium carbonate, calcium silicate, magnesium carbonate, boron nitride; glass fibers; carbon fibers, boron carbide fibers; wollastonite; silicon carbide fibers; boron fibers, graphene, carbon nanotubes (CNT), and the like. Most preferably, the reinforcing filler is glass fiber, preferably chopped glass fiber, or carbon fiber, preferably chopped carbon fibers.

The amount of the reinforcing filler may range in the case of particulate fillers, from 1 wt. % to 40 wt. %, preferably from 5 wt. % to 35 wt. % and most preferably from 10 wt. % to 30 wt. %, and in the case of fibrous fillers from 5 wt. % to 50 wt. %, preferably from 10 wt. % to 40 wt. %, and most preferably from 15 wt. % to 30 wt. % based on the total weight of the polymer composition. Preferably, the polymer composition includes about 25 to about 35 wt. %, most preferably about 30 wt. %, of glass or carbon fiber, most preferably glass fiber. In some embodiments, the polymer composition is free of a fibrous filler, a particulate filler, or both.

Optional Additives

The polymer composition may further include optional additives such as titanium dioxide, zinc sulfide, zinc oxide, ultraviolet light stabilizers, heat stabilizers, antioxidants such as organic phosphites and phosphonites, acid scavengers, processing aids, nucleating agents, lubricants, flame retardants, smoke-suppressing agents, anti-static agents, anti-blocking agents, and conductivity additives such as carbon black.

When one or more optional additives are present, their total concentration is preferably less than 10 wt. %, more preferably less than 5 wt. %, and most preferably less than 2 wt. %, based on the total weight of polymer composition.

Metal Substrate

The metal substrate is preferably copper, steel, aluminum, or a combination thereof, preferably aluminum.

In some embodiments, the metal substrate (e.g. an aluminum substrate) has a structured metal surface. "Structured metal surface" means a metal surface that has undergone any etching process known to those of skill in the art to roughen the metal surface by removing at least part of the metal. Examples of structured metal surfaces include laser etched metal surfaces and chemically etched metal surfaces. In some embodiments, the metal surface is an un-etched metal surface.

In some aspects, the metal substrate is a nano-structured metal surface. "Nano-structured metal surface" means a metal surface that has been etched to have a nano-pitted surface with surface peaks and valleys having average depth, height and width dimensions in the nano-scale regime ranging from 10 to 1000 nm, preferably from 30 to 800 nm, and more preferably from 50 to 500 nm. In some embodiments, the metal substrate has an NMT-treated surface. "NMT-treated metal surface" means a nano-structured surface prepared by any etching/priming process described in EP1459882 B1, EP1559542 A1, or WO 2011123790 A1, the disclosures of which are incorporated herein by reference in their entireties.

Methods of Making the Polymer Composition

Exemplary embodiments also include methods of making the polymer composition.

The polymer composition can be made by methods well known to the person of skill in the art. For example, such methods include, but are not limited to, melt-mixing processes. Melt-mixing processes are typically carried out by heating the polymer components above the melting temperature of the thermoplastic polymers thereby forming a melt of the thermoplastic polymers. In some embodiments, the processing temperature ranges from about 280-450° C., preferably from about 290-440° C., from about 300-430° C. or from about 310-420° C. Suitable melt-mixing apparatus are, for example, kneaders, Banbury mixers, single-screw extruders, and twin-screw extruders. Preferably, use is made of an extruder fitted with means for dosing all the desired components to the extruder, either to the extruder's throat or to the melt. In the process for the preparation of polymer composition, the components of the polymer composition, e.g. the PEEK-PEDEK copolymer, the optional PEEK, the optional PEKK, the optional reinforcing filler, and optional additives, are fed to the melt-mixing apparatus and melt-mixed in that apparatus. The components may be fed simultaneously as a powder mixture or granule mixture, also known as dry-blend, or may be fed separately.

The order of combining the components during melt-mixing is not particularly limited. In one embodiment, the component can be mixed in a single batch, such that the desired amounts of each component are added together and subsequently mixed. In other embodiments, a first sub-set of components can be initially mixed together and one or more of the remaining components can be added to the mixture for further mixing. For clarity, the total desired amount of each component does not have to be mixed as a single quantity. For example, for one or more of the components, a partial quantity can be initially added and mixed and, subsequently, some or all of the remainder can be added and mixed.

Polymer-Metal Junction and Methods of Making

Exemplary embodiments are also directed to a polymer-metal junction including the polymer composition as described herein in contact with, preferably adhered to the metal substrate and a method of making the polymer-metal junction.

The metal substrate can include any metallic composition including, but not limited to, aluminum, copper, gold, iron, nickel, platinum, silver, steel, and blends or alloys thereof (e.g., brass and bronze). In some embodiments, the polymer-metal junction including the polymer composition comprises a polymer layer with a thickness of at least 25 µm up to several mm.

The polymer-metal junction can be made by contacting the polymer composition as described herein with the metal substrate, preferably a structured metal surface, more preferably a nano-structured metal surface, most preferably an NMT-treated metal surface. For example, the polymer composition may be deposited on or over-molded onto the metal substrate using any suitable melt-processing and deposition method. In particular, the polymer-metal junction may be made by injection or compression molding, or coating the polymer composition onto the metal substrate.

In some embodiments, the polymer-metal junction is formed by injection molding the polymer composition onto a metal substrate.

In some aspects, the polymer-metal junction may be formed by an electrostatic or solvent-borne powder coating process.

According to exemplary embodiments, the polymer-metal junction may be formed by an extrusion process for coating a wire or cable.

Shaped Articles and Methods of Making

Exemplary embodiments also include shaped articles comprising the polymer-metal junction and methods of making the shaped articles.

The polymer composition may be well suited for the manufacture of articles useful in a wide variety of applications. For example, the high adhesive strength to metals and chemical resistance of the polymer composition makes it especially suitable for use in mobile electronic devices, especially in structural components for mobile electronic devices (e.g., framework or housing), wire coatings (e.g. magnet wire coatings in hybrid and electric vehicles), connectors (e.g. electrical connectors), and oil and gas applications (e.g. downhole cable coatings).

The term "mobile electronic device" is intended to denote any electronic device that is designed to be conveniently transported and used in various locations while exchanging/providing access to data, e.g. through wireless connections or mobile network connection. Representative examples of mobile electronic devices include mobile phones, personal digital assistants, laptop computers, tablet computers, radios, cameras and camera accessories, watches, calculators, music players, global positioning system receivers, portable games, hard drives and other electronic storage devices, and the like.

In some aspects, the shaped articles may be made from the polymer composition using any suitable melt-processing method such as injection molding, extrusion molding, roto-molding, or blow-molding.

Exemplary embodiments are also directed to methods of making shaped articles by additive manufacturing, where the shaped article is printed from the polymer composition. The methods include printing layers of the shaped article from the polymer composition as described below.

Additive manufacturing systems are used to print or otherwise build a shaped object from a digital representation of the shaped object by one or more additive manufacturing techniques. Examples of commercially available additive manufacturing techniques include extrusion-based techniques, selective laser sintering, powder/binder jetting, electron-beam melting, and stereolithography processes. For each of these techniques, the digital representation of the shaped object is initially sliced into multiple horizontal layers. For each layer, a tool path is then generated, which provides instructions for the particular additive manufacturing system to print the given layer.

Accordingly, some embodiments include a method of making a shaped article comprising printing layers of the polymer composition to form the shaped article by an extrusion-based additive manufacturing system (for example FFF), a powder-based additive manufacturing system (for example SLS), or a continuous Fiber-Reinforced Thermoplastic (FRTP) printing method.

Exemplary embodiments will now be described in the following non-limiting examples.

EXAMPLES

The lap shear strength and heat of fusion were evaluated for a variety of polymer compositions and aluminum substrates.

Materials

KetaSpire® PEEK KT-880P [MV (400° C., 1000 s−1) is 0.15 kPa·s, Tm=344° C.], is a PEEK polymer available from Solvay Specialty Polymers USA, LLC.

Cypek® DS-E and DS-M PEKK are amorphous PEKKs available from Solvay Specialty Polymers USA, LLC. Cypek® DS-E and DS-M PEKK comprise recurring units of formulae (D-1) and (D-2) in a molar ratio ranging from 55/45 to 65/35.

Cypek® FC PEKK is a crystalline PEKK available from Solvay Specialty Polymers USA, LLC. Cypek® FC PEKK comprises recurring units (D-1) and (D-2) in a molar ratio ranging from 66/34 to 75/25.

4,4'-Biphenol, polymer grade, was procured from SI, USA.

4,4'-Difluorobenzophenone, polymer grade, was procured from Jintan, China.

Diphenyl sulfone (polymer grade) was procured from Proviron (99.8% pure).

Sodium carbonate, light soda ash, was procured from Solvay S.A., France.

Potassium carbonate with a $d_{90}$<45 μm was procured from Armand products.

Lithium chloride (anhydrous grade) was procured from Acros.

Fiberglass: Chopped E type glass fiber OCV910A was procured from Owens Corning.

1,4-Bis(4-phenoxybenzoyl)benzene ("DTD Oligomer") obtained from Rallis.

Aluminum A-6061 substrates (NMT-treated aluminum coupons) obtained from Taiseiplas.

Aluminum A-6061 substrates (non NMT-treated) were obtained from McMaster Carr and machined into the geometry indicated in the examples.

1100 shim stock was obtained from McMaster Carr.

Thermal Analysis

The melting temperature (Tm), crystallization temperature (Tc), glass transition temperature (Tg) and heat of fusion were determined by differential scanning calorimeter (DSC) according to ASTM D3418-03, E794-06, E1356-03, and E793-06.

In the present Examples, a TA Instruments DSC Q20 was used with nitrogen as carrier gas (99.998% purity, 50 mL/min). Temperature and heat flow calibrations were done using indium. Sample size was 5 to 7 mg. The weight was recorded ±0.01 mg. For polymer compositions comprising only polymers with Tm<360° C., the heat cycles were:

1st heat cycle: 30.00° C. to 400.00° C. at 20.00° C./min, isothermal at 400.00° C. for 1 min;
1st cool cycle: 400.00° C. to 30.00° C. at 20.00° C./min, isothermal for 1 min;
2nd heat cycle: 30.00° C. to 400.00° C. at 20.00° C./min, isothermal at 400.00° C. for 1 min.

For polymer compositions comprising at least one polymer with Tm≥360° C., the heat cycles were:

1st heat cycle: 30.00° C. to 450.00° C. at 20.00° C./min, isothermal at 400.00° C. for 1 min;
1st cool cycle: 450.00° C. to 30.00° C. at 20.00° C./min, isothermal for 1 min;

2nd heat cycle: 30.00° C. to 450.00° C. at 20.00° C./min, isothermal at 400.00° C. for 1 min.

The melting temperature (Tm) was determined as the peak temperature of the melting endotherm on the second heat scan. The melting of the composition was taken as the area over a linear baseline drawn from 220° C. to a temperature above the last endotherm. The crystallization temperature (Tc) was recorded as the peak crystallization temperature during the first cool down. The glass transition temperature (Tg) was recorded from the second heat up using the half height method.

The heat of fusion was determined as the area under the melting endotherm on the second heat scan in a differential scanning calorimeter (DSC) according to ASTM D3418-03 and E793-06 using heating and cooling rates of 20° C./min. The heat of fusion was determined on the second heat scan and was taken as the area over a linear baseline drawn from above the glass transition temperature (Tg) to a temperature above the end of the endotherm.

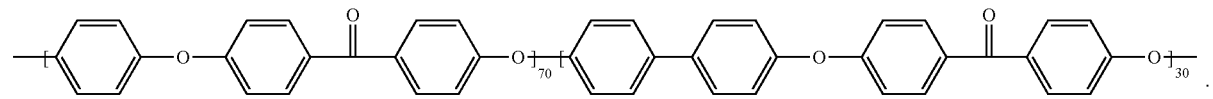

For filled compositions, the heat of fusion measured was corrected for filler content to express the heat of fusion of the polymer component only, excluding the filler. This was done by dividing the measured heat of fusion on the second heat up cycle by the weight fraction of the polymer component (typically 0.7) thus excluding the filler.

As used herein, "heat of fusion" means the heat of fusion of the polymer component of the polymer composition as determined as described above.

Determination of Melt Viscosity (MV)

The melt viscosity was measured using a capillary rheometer pursuant to ASTM D3835. Readings were taken after a 10-minute dwell time at 410° C. and a shear rate of 46.3 s$^{-1}$ using a tungsten-carbide die with the following characteristics: diameter=1.016 mm, length=20.32 mm, cone angle=120°.

Analysis of PEEK-PEDEK Copolymer Compositions

Comparative Example 1

KetaSpire® PEEK KT-880 was used as Comparative Example 1.

Comparative Example 2: Preparation of 70/30 PEEK-PEDEK Copolymer

In a 500 mL 4-neck reaction flask fitted with a stirrer, a N$_2$ inlet tube, a Claisen adapter with a thermocouple plunging in the reaction medium, and a Dean-Stark trap with a condenser and a dry ice trap were introduced 129.80 g of diphenyl sulfone, 18.942 g of hydroquinone, 13.686 g of 4,4'-biphenol and 54.368 g of 4,4'-difluorobenzophenone. The flask content was evacuated under vacuum and then filled with high purity nitrogen (containing less than 10 ppm O$_2$). The reaction mixture was then placed under a constant nitrogen purge (60 mL/min).

The reaction mixture was heated slowly to 150° C. At 150° C., a mixture of 26.876 g of Na$_2$CO$_3$ and 0.1524 g of K$_2$CO$_3$ was added via a powder dispenser to the reaction mixture over 30 minutes. At the end of the addition, the reaction mixture was heated to 320° C. at 1° C./minute. After 10 minutes at 320° C., 6.415 g of 4,4'-difluorobenzophenone were added to the reaction mixture while keeping a nitrogen purge on the reactor. After 5 minutes, 0.418 g of lithium chloride were added to the reaction mixture. 10 minutes later, another 2.138 g of 4,4'-difluorobenzophenone were added to the reactor and the reaction mixture was kept at temperature for 15 minutes.

The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 73 g of a white powder.

The repeat units of the polymer were:

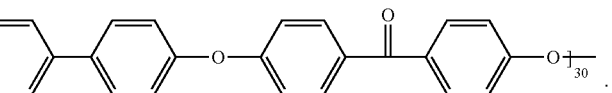

The melt viscosity measured by capillary rheology at 410° C., 46 s$^{-1}$, was 0.30 kN·s/m$^2$.

Comparative Example 3: Preparation of 75/25 PEEK-PEDEK Copolymer

In a 500 mL 4-neck reaction flask fitted with a stirrer, a N$_2$ inlet tube, a Claisen adapter with a thermocouple plunging in the reaction medium, and a Dean-Stark trap with a condenser and a dry ice trap were introduced 128.21 g of diphenyl sulfone, 20.295 g of hydroquinone, 11.405 g of 4,4'-biphenol and 54.368 g of 4,4'-difluorobenzophenone. The flask content was evacuated under vacuum and then filled with high purity nitrogen (containing less than 10 ppm O$_2$). The reaction mixture was then placed under a constant nitrogen purge (60 mL/min).

The reaction mixture was heated slowly to 150° C. At 150° C., a mixture of 26.876 g of Na$_2$CO$_3$ and 0.169 g of K$_2$CO$_3$ was added via a powder dispenser to the reaction mixture over 30 minutes. At the end of the addition, the reaction mixture was heated to 320° C. at 1° C./minute. After 10 minutes at 320° C., 6.415 g of 4,4'-difluorobenzophenone were added to the reaction mixture while keeping a nitrogen purge on the reactor. After 5 minutes, 0.418 g of lithium chloride were added to the reaction mixture. 10 minutes later, another 2.138 g of 4,4'-difluorobenzophenone were added to the reactor and the reaction mixture was kept at temperature for 15 minutes.

The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 74 g of a white powder.

The repeat units of the polymer were:

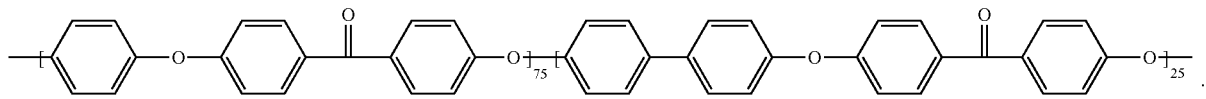

The melt viscosity measured by capillary rheology at 410° C., 46 s$^{-1}$, was 0.21 kN·s/m$^2$.

Comparative Example 4: Preparation of 80/20 PEEK-PEDEK Copolymer

In a 500 mL 4-neck reaction flask fitted with a stirrer, a N$_2$ inlet tube, a Claisen adapter with a thermocouple plunging in the reaction medium, and a Dean-Stark trap with a condenser and a dry ice trap were introduced 127.7 g of diphenyl sulfone, 21.861 g of hydroquinone, 9.207 g of 4,4'-biphenol and 54.835 g of 4,4'-difluorobenzophenone. The flask content was evacuated under vacuum and then filled with high purity nitrogen (containing less than 10 ppm O$_2$). The reaction mixture was then placed under a constant nitrogen purge (60 mL/min).

The reaction mixture was heated slowly to 150° C. At 150° C., a mixture of 27.339 g of Na$_2$CO$_3$ and 0.171 g of K$_2$CO$_3$ was added via a powder dispenser to the reaction mixture over 30 minutes. At the end of the addition, the reaction mixture was heated to 320° C. at 1° C./minute. After 4 minutes at 320° C., 6.577 g of 4,4'-difluorobenzophenone were added to the reaction mixture while keeping a nitrogen purge on the reactor. After 5 minutes, 1.285 g of lithium chloride were added to the reaction mixture. 10 minutes later, another 2.192 g of 4,4'-difluorobenzophenone were added to the reactor and the reaction mixture was kept at temperature for 15 minutes.

The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 72 g of a white powder.

The repeat units of the polymer were:

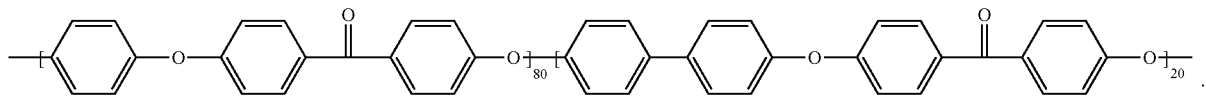

The melt viscosity measured by capillary rheology at 410° C., 46 s$^{-1}$, was 0.15 kN·s/m$^2$.

Example 5: Preparation of 40/60 PEEK-PEDEK Copolymer

In a 500 mL 4-neck reaction flask fitted with a stirrer, a N$_2$ inlet tube, a Claisen adapter with a thermocouple plunging in the reaction medium, and a Dean-Stark trap with a condenser and a dry ice trap were introduced 127.70 g of diphenyl sulfone, 9.894 g of hydroquinone, 25.103 g of 4,4'biphenol and 50.130 g of 4,4'-difluorobenzophenone. The flask content was evacuated under vacuum and then filled with high purity nitrogen (containing less than 10 ppm O$_2$). The reaction mixture was then placed under a constant nitrogen purge (60 mL/min).

The reaction mixture was heated slowly to 150° C. At 150° C., a mixture of 25.097 g of Na2CO3 and 0.155 g of K2CO3 was added via a powder dispenser to the reaction mixture over 30 minutes. At the end of the addition, the reaction mixture was heated to 320° C. at 1° C./minute. After 2 minutes at 320° C., 5.892 g of 4,4'-difluorobenzophenone were added to the reaction mixture while keeping a nitrogen purge on the reactor. After 5 minutes, 0.384 g of lithium chloride were added to the reaction mixture. 10 minutes later, another 1.964 g of 4,4'-difluorobenzophenone were added to the reactor and the reaction mixture was kept at temperature for 15 minutes.

The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 74 g of a white powder.

The repeat units of the polymer were:

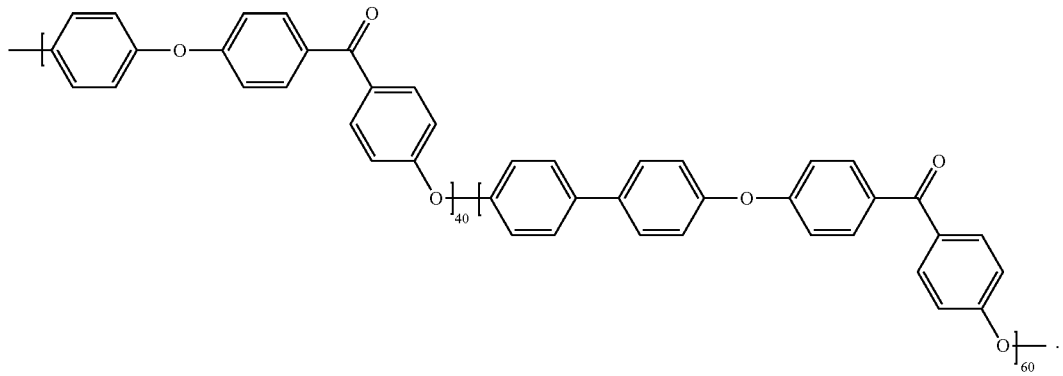

The melt viscosity, measured by capillary rheology at 410° C., 46 s$^{-1}$, was found to be 0.18 kN·s/m$^2$.

Comparative Example 6: Preparation of 25/75 PEEK-PEDEK Copolymer

In a 500 mL 4-neck reaction flask fitted with a stirrer, a N2 inlet tube, a Claisen adapter with a thermocouple plunging in the reaction medium, and a Dean-Stark trap with a condenser and a dry ice trap were introduced 212.00 g of diphenyl sulfone, 4.226 g of hydroquinone, 21.442 g of 4,4'biphenol and 33.853 g of 4,4'-difluorobenzophenone. The flask content was evacuated under vacuum and then filled with high purity nitrogen (containing less than 10 ppm O$_2$). The reaction mixture was then placed under a constant nitrogen purge (60 mL/min).

The reaction mixture was heated slowly to 150° C. At 150° C., a mixture of 16.812 g of Na$_2$CO$_3$ and 0.106 g of K$_2$CO$_3$ was added via a powder dispenser to the reaction mixture over 30 minutes. At the end of the addition, the reaction mixture was heated to 340° C. at 1° C./minute. After 7 minutes at 340° C., 3.928 g of 4,4'-difluorobenzophenone were added to the reaction mixture while keeping a nitrogen purge on the reactor. After 5 minutes, 0.651 g of lithium chloride were added to the reaction mixture. 10 minutes later, another 1.309 g of 4,4'-difluorobenzophenone were added to the reactor and the reaction mixture was kept at temperature for 15 minutes.

The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 53 g of a white powder.

The repeat units of the polymer were:

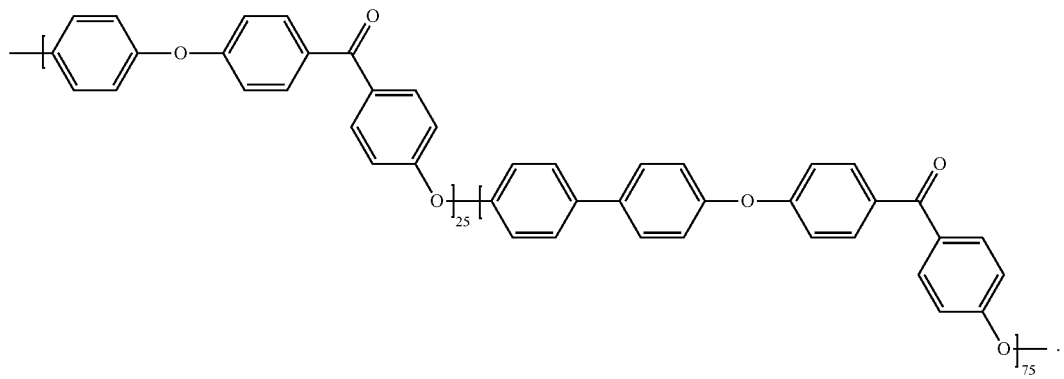

The melt viscosity measured by capillary rheology, as above detailed, at 410° C., 46 s$^{-1}$, was found to be 0.12 kN·s/m2.

Preparation of Glass Fiber-Reinforced PEEK-PEDEK Copolymer Compositions

For the examples shown in Table 1 below, the polymeric ingredients of the composition were tumble blended for 10 minutes in a 5-gallon drum. The pre-mixed blend was fed into the feed throat of a 26 mm Coperion ZSK-26 twelve barrel co-rotating intermeshing twin-screw extruder. The resin mix was metered using a gravimetric feeder while fiberglass was fed into barrel 7 to generate a final product with 30 wt % glass content. The compounding throughput was maintained at 25-35 lb/hr. Example 11 was produced using barrel temperature set points of 400° C. in the first five barrels followed by two barrels at 380° C., 340° C. for the following five barrels and a die temperature of 380° C. resulting in a melt strand with a melt temperature of approximately 400° C. as measured by a handheld temperature probe. Example 12 was generated similarly but with temperatures of 400° C. for the first 8 barrels. This material also exhibited a melt temperature of approximately 400° C. Vacuum venting of approximately 25 in Hg was provided to remove moisture and any other volatile residues from the compound just prior to the melt entering the die and exiting the compounding machine. The extrudate of the compound was stranded from the die and cooled in air and water and then pelletized for convenient handling.

TABLE 1

Glass-Fiber Reinforced Compositions

| Composition | Repeat Unit(s) | Source (Synthesis Example) | PEEK/ PEDEK ratio | Tm (° C.) | Heat of fusion (J/g) |
|---|---|---|---|---|---|
| C7 | PEEK | C1 | 100/0 | 341 | 54.0 |
| C8 | PEEK/PEDEK | C2 | 70/30 | 295 | 30.0 |
| C9 | PEEK/PEDEK | C3 | 75/25 | 305 | 38.1 |
| C10 | PEEK/PEDEK | C4 | 80/20 | 317 | 42.7 |
| E11 | PEEK/PEDEK | E5 | 40/60 | 364 | 56.8 |
| C12 | PEEK/PEDEK | C6 | 25/75 | 390 | 85.9 |

Adhesion Testing of PEEK-PEDEK Copolymers to Laser-Etched Aluminum

These examples demonstrate the adhesion of overmold polymer compositions to aluminum A-6061 substrates using poly(aryl ether) adhesive compositions. To demonstrate adhesion, lap shear samples were prepared, and the lap shear stress was measured at room temperature according to ASTM D1002 with a grip distance of 3.5 inches. Lap shear samples were prepared by overmolding the metal substrates with the example compositions. The metal substrates were formed from aluminum 6061 alloy and had a double butt lap joint with a surface area of about 0.25 square inches.

The aluminum substrates were laser etched (Minilase™, from Tykma Technologies) to form a crosshatch pattern having a distance of about 100 µm between parallel lines. Following etching, the metal substrates were rinsed in acetone or isopropanol and dried in a vacuum oven at about 50 Torr to about 100 Torr and at about 50° C. to 100° C.

The polymer compositions of the examples were deposited on the metal substrates using injection molding (pellets pre-dried at 120° C./25" Hg vacuum for 4 hours). In particular, the metal substrates were preheated to a temperature of about 190° C. to about 200° C. in an oven and, subsequently, on a hotplate. The preheated substrates were then placed in an injection mold heated to about 199° C. The polymer compositions were then injected, into the mold, at a temperature between from about 370° C. to about 380° C. to form the lap shear samples (380-395° C. for Example 11, 395-405° C. for Example 12)). The lap shear sample was removed from the mold and allowed to continue to cool to room temperature.

The lap shear stress values, measured at 0.05 in/minute, listed in Table 2 were averaged over the number of lap shear samples in the corresponding Sample Set. The enthalpy of fusion, indicative of the degree of crystallinity of the polymer compositions, derived from the melting endotherm on the 2nd heat scan in DSC at 20° C./minute is also indicated in Table 2. The values are expressed relative to the polymer content of the composition, i.e. excluding the filler content. This was obtained by dividing the values measured for the filled compositions by the polymer content (=0.70).

The results of the lap shear test measurements are reported with respect to lap shear stress at break as well the type of failure at break. In particular, following failure of the lap shear samples, the samples were analyzed to determine if the failure was "Adhesive", "Cohesive", "Partially Cohesive" or "Specimen Break." Adhesive failures were characterized by a lack of visually detectable polymer on the metal and lack of visually detectable metal on the polymer, on the fracture surface of the sample. Cohesive failures were characterized by a visually detectable amount of polymer on the metal or a visually detectable amount of metal on the polymer, on the fracture surface of the sample. Partially Cohesive failures were analogous to Cohesive failures but showed a reduced amount of polymer on the metal or metal on the polymer. "Specimen Break" was characterized by fracture in the polymer composition and not at the metal/polymer interface.

TABLE 2

Adhesion Testing of PEEK-PEDEK Copolymers to Aluminum

| Example | Source | Polymer Component | Heat of fusion (J/g) | Lap shear Stress (psi) | Std. dev. (psi) | No. Cohesive Failures |
|---|---|---|---|---|---|---|
| C13 | C7 | PEEK | 54.0 | 775 | 105 | 0/5 |
| C14 | C8 | 70/30 PEEK/PEDEK | 30.0 | 1614 | 165 | 5/5 |
| C15 | C9 | 75/25 PEEK/PEDEK | 38.1 | 1360 | 96 | 4/5 |
| C16 | C10 | 80/20 PEEK/PEDEK | 42.7 | 1079 | 324 | 2/5 |
| E17 | E11 | 40/60 PEEK/PEDEK | 56.8 | 998 | 176 | 3/6 |

TABLE 2-continued

Adhesion Testing of PEEK-PEDEK Copolymers to Aluminum

| Example | Source | Polymer Component | Heat of fusion (J/g) | Lap shear Stress (psi) | Std. dev. (psi) | No. Cohesive Failures |
|---|---|---|---|---|---|---|
| C18 | C12 | 25/75 PEEK/PEDEK | 85.9 | 449 | 183 | 0/6 |

Referring to Table 2, the composition according to the invention (E17) unexpectedly exhibited significantly improved adhesive strength to aluminum as compared to PEEK (C13), while also actually improving crystallinity and corresponding chemical resistance. In contrast, the PEEK-PEDEK copolymers of Comparative Examples C14-C16, exhibited good adhesive strength, but with a significant loss of crystallinity (heat of fusion <45.0 J/g). Comparative Example C18 exhibited good crystallinity, but with an approximately 42% loss in adhesive strength when compared with the PEEK of Comparative Example C13.

Analysis of Blends of PEEK-PEDEK Copolymer, Poly(Aryl Ether Ketone) (PAEK) Homopolymer(s), and Glass Fiber Blend Preparation The polymer compositions for this set of examples are described in Table 3 below. These compositions were prepared by melt twin-screw extrusion compounding. The first step in this process was tumble blending pellets and/or powders of the resins and DTD oligomer, where applicable, at the desired compositional ratios for about 20 minutes. This was followed by melt compounding using a 26 mm Coperion® co-rotating partially intermeshing twin screw extruder. The melt temperatures recorded for the extrudate as it exited the die were between 380 and 400° C. for all of the polymer compositions. The resin component(s), the low molecular weight aromatic additive, and the glass fiber were metered gravimetrically. The extruder was operated at a total throughput rate of 35 lb/hr (15.9 kg/hr) and 200 rpm screw speed, and the extruder torque reading was maintained in the 45-65% range during compounding of all the compositions. Vacuum venting with a vacuum level >25 in Hg was applied during compounding to strip off moisture and any possible residual volatiles from the compound. The extrudate from each of the runs was stranded and cooled in a water trough and then pelletized into pellets approximately 2.7 mm in diameter and 3.0 mm in length.

Adhesion of PEEK-PEDEK Copolymer/Poly(Aryl Ether Ketone) (PAEK) Homopolymer Blends to NMT-Treated Aluminum Over-molded lap shear specimens were used to quantify the degree of adhesion of each of the polymer compositions to 4.5 mm long×1.75 mm wide×2 mm thick chemically etched A-6061 aluminum coupons obtained from Taiseiplas. A small rectangular bar specimen of polymer was over-molded onto the aluminum coupons using a three-plate mold manufactured and supplied by Taiseiplas Corp. The rectangular strip of plastic over-molded onto the aluminum coupons was 4.5 cm in length, 1.0 cm in width and 3.0 mm in thickness as nominal dimensions. The plastic piece was over-molded onto the aluminum coupons such that there was a mating or overlap area between the two pieces defined by nominal dimensions of 10 mm×5 mm thus providing a nominal lap shear junction area of 50 $mm^2$.

The over-molded aluminum/plastic assembly was tested for lap shear strength in an Instron® tensile testing apparatus following the guidelines of ASTM D1002. A positioning fixture supplied by Taiseiplas was also used to hold the assembly in place in the Instron® grips and to maintain the alignment of the metal and plastic pieces during the tensile pull on the two materials to assure that the force applied on the lap interface of the plastic-metal junction was a purely shear force. A pull rate of 0.05 in/min was used, and the lap shear strength of each specimen was calculated by dividing the load needed to break apart each over-molded assembly by the nominal overlap area of the joint (50 $mm^2$). The lap shear strength is also referred to as the adhesion strength of the plastic to the metal substrate.

TABLE 3

| Components | C19 | C20 | C21 | C22 | E23 | E24 | E25 | E26 |
|---|---|---|---|---|---|---|---|---|
| KetaSpire ® PEEK KT-880P | 70.0 | 68.5 | 47 | 51.37 | 51.37 | 41.10 | 47.0 | 47.00 |
| 40/60 PEEK-PEDEK | — | — | — | — | 17.13 | 27.40 | 31.3 | 11.70 |
| PEKK DS-E | — | — | 31.3 | 17.13 | — | — | — | 19.60 |
| Fiberglass, AGY S2 9 um 553 Sizing | 30.0 | 30.0 | 20.0 | 30.0 | 30.0 | 30.0 | 20.0 | 20.0 |
| DTD Oligomer | — | 1.5 | 1.7 | 1.5 | 1.5 | 1.5 | 1.7 | 1.7 |
| Adhesion Test Results | | | | | | | | |
| Lap Shear Strength (MPa) | 8.1 | 12.8 | 14.9 | 15.5 | 19.0 | 25.1 | 22.6 | 27.2 |
| Lap Shear Std. Dev. (MPa) | 3.8 | 2.3 | 5.4 | 3.0 | 3.0 | 5.5 | 7.1 | 2.8 |
| Heat of Fusion (J/g) | 57.0 | 60.6 | 51.1 | 49.8 | 59.6 | 56.6 | 62.6 | 51.6 |

Note:
All proportions of ingredients are weight %.
(4.5%, 135%)

Comparative Examples C19 and C20 show the overmolding adhesion performance of glass reinforced PEEK in the absence and presence of DTD Oligomer. However, even with the DTD Oligomer, the lap shear strength was only around 12.8 MPa. As shown by Comparative Examples C21 and C22, the addition of amorphous PEKK resulted in a further increase in adhesion; however, with a reduction in the level of crystallinity relative to PEEK (with or without the DTD Oligomer). As shown in Examples E23, E24, and E25, the inclusion of PEEK-PEDEK copolymer was unexpectedly found to significantly improve adhesion strength relative to the Comparative Examples while maintaining a crystallinity level on par or greater than that of PEEK. Finally, in Example E26, the replacement of only about 12 wt. % of the PEKK of Comparative Example C21 with PEEK-PEDEK copolymer was surprisingly found to nearly double the adhesion strength and increase crystallinity relative to Comparative Example C21. Moreover, although the heat of fusion of Example E26 was less than that of PEEK, the composition unexpectedly exhibited a 336% increase in lap shear strength relative to the PEEK of Comparative Example C19.

Adhesion of PEEK-PEDEK Copolymer/Poly(Aryl Ether Ketone) (PAEK) Homopolymer Blends to Un-Etched Aluminum Aluminum 1100 was obtained in 0.005" thick shim stock. Each shim was cleaned using a wash with acetone followed by a wash with isopropanol to remove surface contamination including oils and grease.

Polymer compositions with glass fiber were prepared using a twin screw extruder as described above. Aluminum samples of approximately 2×3×0.125 inches were overmolded with glass filled polymer compositions as detailed in Table 4. A Mini-jector® injection molding machine was used for the overmolding process.

The adhesion of the polymer to metal was evaluated qualitatively. An acceptable junction designated as "Pass" was one that showed good contact between metal and polymer by a smooth, flat metal surface. Materials with lower adhesion performance have the aluminum partially or completely detach from the polymer surface after cooling post-molding. Polymer-metal samples that showed any unevenness due to partial detachment or complete detachment were designated as "Fail."

TABLE 4

| Adhesion to Un-Etched Aluminum | | | | | |
|---|---|---|---|---|---|
| | C27 | C28 | E29 | E30 | E31 |
| PEEK (C7) | 70 | 42 | 42 | 28 | 42 |
| 80/20 PEEK-PEDEK (C10) | — | 28 | — | — | — |
| 40/60 PEEK-PEDEK (E11) | — | — | 28 | 42 | 10.5 |
| PEKK DS-E | — | — | — | — | 17.5 |
| Glass Fiber (OCV 910A) | 30 | 30 | 30 | 30 | 30 |
| Heat of Fusion (J/g) | 53.9 | 80.4 | 69.8 | 64.3 | 63.1 |
| Polymer-Metal Adhesion | Fail | Fail | Pass | Pass | Pass |

Note:
All amounts are weight %.

As shown above in Table 4, adhesive strength to aluminum of blends of PEEK and 40/60 PEEK-PEDEK copolymer (Examples E29 and E30) and the ternary blend of Example E31 was surprisingly improved as compared to PEEK alone (C27) and a blend of PEEK with 80/20 PEEK-PEDEK copolymer (C28).

Adhesion of PEEK-PEDEK Copolymer/Poly(Aryl Ether Ketone) (PAEK) Homopolymer Blends to Laser-Etched Aluminum A procedure was followed as described above; however laser etched aluminum was overmolded on a Mini-Jector® molding machine using barrel temperatures of 393° C. rear, 393° C. front, 399° C. nozzle, 199° C. mold, 900 psi pressure, 2 second injection time, and 20 second cycle time. Blends of PEEK and PEEK-PEDEK copolymer with glass fiber for the overmolding evaluation were prepared using a twin screw extruder as described above.

TABLE 5

| Adhesion to Laser-Etched Aluminum | | | | | | | |
|---|---|---|---|---|---|---|---|
| | C32 | C33 | C34 | E35 | E36 | E37 | E38 |
| PEEK (C7) | 70 | 52.5 | 42 | 52.5 | 42 | 28 | 42 |
| 80/20 PEEK-PEDEK (C10) | — | 17.5 | 28 | — | — | — | — |
| PEKK DS-E | | | | | | | 17.5 |
| 40/60 PEEK-PEDEK (E11) | — | — | — | 17.5 | 28 | 42 | 10.5 |
| Glass Fiber (OCV 910A) | 30 | 30 | 30 | 30 | 30 | 30 | 30 |
| Heat of Fusion (J/g) | 53.9 | 68.8 | 80.4 | 51.1 | 69.8 | 64.3 | 63.1 |
| Lap Shear Strength (psi) | 969 | 861 | 1010 | 1140 | 1150 | 1140 | 1150 |
| Std. Dev. (psi) | 294 | 261 | 264 | 345 | 348 | 347 | 350 |

Note:
All amounts are weight %.

As shown above in Table 5, the inventive compositions including 40/60 PEEK-PEDEK copolymer (E35-E38) unexpectedly exhibited significantly improved adhesion strength relative to the compositions of Comparative Examples C32-C34, while the crystallinity of the inventive compositions was on par with or better than that of PEEK (C32).

Additional Examples

Comparative Example 39: Preparation of PEDEK-PEEK Copolymer 50/50

In a 1000 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 341.75 g of diphenyl sulfone, 33.859 g of hydroquinone, 57.260 g of 4,4'-biphenol and 135.132 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 67.465 g of $Na_2CO_3$ and 0.425 g of $K_2CO_3$ was added via a powder dispenser to the reaction mixture over 20 minutes. At the end of the addition, the reaction mixture was heated to 320° C. at 1° C./minute. After 1 minute at 320° C., 16.104 g of 4,4'-difluorobenzophenone were added to the reaction mixture while keeping a nitrogen purge on the reactor. After 5 minutes, 1.049 g of lithium chloride were added to the reaction mixture. Ten minutes later, another 5.369 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 190 g of a white powder. The repeat unit of the polymer is:

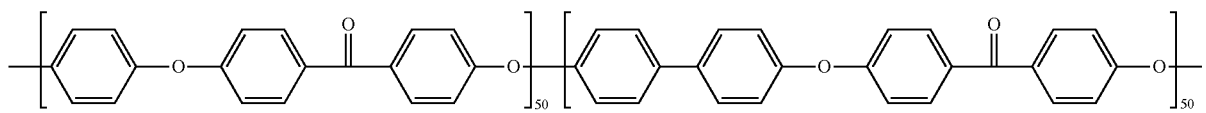

The melt viscosity, measured by capillary rheology at 410° C., 46 s$^{-1}$ was found to be 10.9 kN-s/m$^2$.

Example 40: Preparation of PEEK-PEDEK Copolymer 30/70

In a 1000 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 435.51 g of diphenyl sulfone, 14.039 g of hydroquinone, 55.397 g of 4,4'-biphenol and 93.384 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 46.622 g of $Na_2CO_3$ and 0.294 g of $K_2CO_3$ was added via a powder dispenser to the reaction mixture over 30 minutes. At the end of the addition, the reaction mixture was heated to 340° C. at 1° C./minute. After 20 minutes at 340° C., 11.128 g of 4,4'-difluorobenzophenone were added to the reaction mixture while keeping a nitrogen purge on the reactor. After 5 minutes, 1.450 g of lithium chloride were added to the reaction mixture. Ten minutes later, another 3.710 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 135 g of a white powder. The repeat unit of the polymer is:

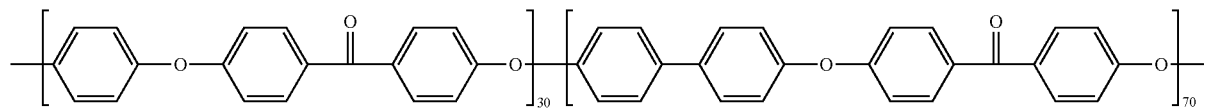

The melt viscosity measured by capillary rheology at 410° C., 46 s−1 was 0.88 kN-s/m².

For Examples C42 and E43 in Table 6, the two polymeric ingredients of the composition (PAEK-1 and PAEK-2) were first tumble blended for 20 minutes in a 5-gallon drum to create a premix of the resins. The premix was next metered to the feed throat of a 25 mm Berstorff co-rotating intermeshing twin-screw extruder having eight barrel sections. The compounded extrudate was stranded from the die and cooled in a water bath and then cut into cylindrical pellets approximately 3.0 mm in length and 2.7 mm in diameter.

The melting temperatures (Tm) shown in Table 6 were determined as the peak temperature of the melting endotherm on the 2nd heat scan in DSC at 20° C./minute.

TABLE 6

PEEK / PEEK-PEDEK Blends

| Example | Source | Polymer 1 | Polymer 2 | PEEK/ PEEK-PEDEK (wt/wt) | Tm (° C.) | Heat of fusion (J/g) |
|---|---|---|---|---|---|---|
| C41 |  | PEEK |  | 100/0 | 341 | 54.0 |
| C42 | C39 | PEEK | 50/50 PEEK-PEDEK | 60/40 | 335 | 50.4 |
| E43 | E40 | PEEK | 30/70 PEEK-PEDEK | 60/40 | 337/368 | 56.6 |

The compositions C41 to E43 were then evaluated by a lap shear test on etched aluminum using the same method as described above for the data presented in Table 2.

TABLE 7

Lap Shear Test on Aluminum

| Example | PAEK composition | Heat of fusion (J/g polymer) of composition | Lap shear Stress (psi) | Std. dev. (psi) | No. Cohesive Failures | Failure Type |
|---|---|---|---|---|---|---|
| C44 | C41 | 54.0 | 775 | 105 | 0/5 | adhesive |
| C45 | C42 | 50.4 | 710 | 81 | 0/5 | adhesive |
| E46 | E43 | 56.6 | 1140 | 183 | 1/5 | 1 specimen break + 4 adhesive |

Referring to Table 7, the results demonstrate that the compositions of the invention surprisingly exhibit significantly improved adhesion to aluminum as compared with PEEK (C44), while retaining a good level of crystallinity (>45.0 J/g heat of fusion).

Should the disclosure of any patents, patent applications, and publications which are incorporated herein by reference conflict with the description of the present application to the extent that it may render a term unclear, the present description shall take precedence.

The invention claimed is:

1. A polymer-metal junction comprising a polymer composition in contact with a metal substrate, wherein:

the polymer composition comprises a polymer component including a PEEK-PEDEK copolymer having a PEEK/PEDEK mole ratio ranging from about 45/55 to about 30/70;

the PEEK-PEDEK copolymer has melting point (Tm) greater than 320° C. as determined by differential scanning calorimeter (DSC) according to ASTM D3418-03 and E794-06; and the polymer composition includes less than 10 wt. % of a sulfur-or-carbonyl-containing solvent, based on the total weight of the polymer composition.

2. The polymer-metal junction of claim 1, wherein the PEEK/PEDEK mole ratio ranges from about 40/60 to about 30/70.

3. The polymer-metal junction of claim 1, wherein the PEEK-PEDEK copolymer has a melting temperature (Tm), a crystallization temperature (Tc), and a glass transition temperature (Tg) satisfying the relationship, (Tm−Tc)/(Tm−Tg)<0.31.

4. The polymer-metal junction of claim 1, wherein the polymer component further comprises a poly(ether ether ketone) (PEEK).

5. The polymer-metal junction of claim 1, wherein the polymer component further comprises a poly(ether ether ketone) (PEEK) and a poly(ether ketone ketone) (PEKK).

6. The polymer-metal junction of claim 1, wherein the polymer composition further comprises from 0.5 wt. % to 5 wt. %, relative to the weight of the polymer composition, of at least one low molecular weight aromatic compound of formula (E):

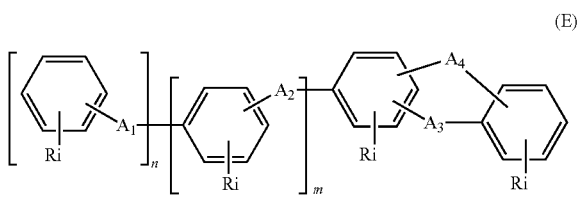

wherein:
each of $A_1$, $A_3$, $A_4$ and is independently selected from the group consisting of a bond, a sulfone group [—S(=O)$_2$—], a ketone group [—C(=O)—], an ether [—O—], and a group —C(R$^5$)(R$^6$)—, provided that $A_4$ is optional;
each $A_2$ is independently selected from the group consisting of a bond, a sulfone group [—S(=O)$_2$—], a ketone group [—C(=O)—], an ether [—O—], a group —C(R$^5$)(R$^6$)—, and a group:

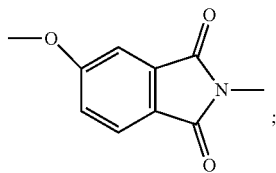

each R$^5$ and R$^6$ is independently selected from the group consisting of a hydrogen, a halogen, an optionally-halogenated alkyl, an alkenyl, an alkynyl, a phenyl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, a —CF$_3$ group, an amine, and a quaternary ammonium;
each R is independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;
each i is independently selected from 0, 1, 2, 3, 4, and 5; provided, however, that the maximum value for i is equal to the number of positions free for substitution on the respective aromatic ring;
n is an integer selected from 0 and 1; and
m is an integer ranging from 0 to 32.

7. The polymer-metal junction of claim 6, wherein the low molecular weight aromatic compound is diphenyl sulfone or 1,4-Bis(4-phenoxybenzoyl)benzene.

8. The polymer-metal junction of claim 1, wherein the polymer component has a heat of fusion greater than 45 J/g, wherein the heat of fusion is determined as the area under a melting endotherm on a second heat scan in a differential scanning calorimeter (DSC) according to ASTM D3418-03 and E793-06 with heating and cooling rates of 20° C./min.

9. The polymer-metal junction of claim 1, wherein the polymer composition further comprises a reinforcing filler.

10. The polymer-metal junction of claim 1, wherein the metal substrate comprises copper, steel, aluminum, or a combination thereof.

11. The polymer-metal junction of claim 1, wherein the metal substrate comprises a structured metal surface.

12. The polymer-metal junction of claim 1, wherein the polymer-metal junction is a coating on a wire or cable.

13. The polymer-metal junction of claim 1, wherein the polymer-metal junction is part of a mobile electronic device.

14. A method of making the polymer-metal junction of claim 1, comprising contacting the metal substrate with the polymer composition.

15. The method of claim 14, wherein the polymer-metal junction is made by injection, compression molding, coating the polymer composition onto the metal substrate, an electrostatic of solvent-borne powder coating process, or extrusion.

16. The method of claim 14, wherein the polymer-metal junction is made by injection molding the polymer composition onto the metal substrate.

17. A shaped article, comprising the polymer-metal junction of claim 1.

18. The shaped article of claim 17, being a structural component for mobile electronic devices.

* * * * *